United States Patent [19]
Guyett et al.

[11] Patent Number: 6,147,935
[45] Date of Patent: Nov. 14, 2000

[54] TRANSFORMERLESS LED DIGITAL ALARM CLOCK

[75] Inventors: Thomas G. Guyett, Gainesville; Michael H. Reeves, Athens, both of Ga.; Stephen B. Hobbs, Kentwood, Mich.

[73] Assignee: GTC Properties, Inc., Wilmington, Del.

[21] Appl. No.: 09/451,492

[22] Filed: Nov. 30, 1999

[51] Int. Cl.[7] .............................. G04B 1/00; G04C 3/00; G04C 17/00; G04C 21/00

[52] U.S. Cl. ........................... 368/204; 368/241; 368/250

[58] Field of Search ........................... 368/72–74, 82–84, 368/203–204, 239–242; 363/35, 37, 55, 63; 345/211

[56] References Cited

U.S. PATENT DOCUMENTS

| | | | |
|---|---|---|---|
| 4,198,629 | 4/1980 | Marion | 540/761 |
| 4,201,039 | 5/1980 | Marion | 368/241 |
| 4,697,930 | 10/1987 | Roberts et al. | 368/82 |

*Primary Examiner*—Vit Miska
*Attorney, Agent, or Firm*—Jones, Day, Reavis & Pogue

[57] ABSTRACT

A transformerless LED digital display clock circuitry using AC line voltage as a primary source of power is disclosed. The AC line voltage is substantially reduced to around 10 volts or less and then rectified to provide DC power to the quartz analog clock. Also included is a NiCad battery circuitry used as a power backup and to allow for occasional but high current using devices. The LED digital display is made up of four separate "digit" displays each independently controlled by four separate cathode outputs from a microprocessor.

15 Claims, 3 Drawing Sheets

TRANSFORMERLESS LED DIGITAL ALARM CLOCK

BACKGROUND OF THE INVENTION

1. Field of the Invention

The present invention relates to clocks and clock radios, and more specifically to a transformerless LED digital alarm clock and LED clock radios using AC line voltage as a primary source of power which is converted to low voltage DC power useful for both running the clock and charging a backup battery. The digital clock uses a programmable microprocessor to provide the display control signals for four individual digit displays such that the "ON" time or duty cycle for each digit begin displayed is at a minimum.

2. Description of Related Art Including Information Disclosed Under 37 CFR 1.97 and 1.98

Over the years the modern world has required higher and higher levels of interaction and interdependence of mankind. In addition, people seem to be performing many more of their activities or tasks during both the day and night. To be able to get all of these tasks and activities accomplished, a greater and greater premium has been placed on punctuality. For example, most activities start at a preset time and tardiness with respect to the activity may have little effect or sometimes disastrous effects. In addition, because of the international element of business, some business meetings such as teleconferencing may take place at any time during the 24 hour day, and travel or transportation for meetings, vacations, etc., may also start and/or terminate at almost any hour.

In any event, time awareness cannot be avoided and the problem of being awakened from a sound sleep has become more and more critical. At the same time, since being awakened artificially almost every morning has become commonplace, clocks used for awakening someone have evolved from the strident sound of the "alarm clock" to the more acceptable and less traumatic wakening to music, news or other pleasant sounds. Modern digital alarm clocks or clock radios also provide LED's (light emitting diodes) for a visual indication of the time even at night. Also, of course, energy conservation in every field is encouraged and some types of clocks such as analog quartz clocks or electronic digital clocks are specifically desirable as they typically have long life and require very little energy to function. Unfortunately, even though the total amount of energy used is small, they do require a constant supply of electrical power to run, and an uninterrupted source of power if they are to remain accurate. Such power sources simply do not exist. Batteries in battery powered devices or clocks run out or "die" and commercially available line AC power supplied to the home and business are occasionally interrupted by a myriad of causes. In addition, techniques for improving the efficiency and dependability of time keeping systems such as alarm clocks, clock radios, etc., are always being sought.

For example, U.S. Pat. No. 4,697,930 to Roberts et al. and entitled "Transformerless Clock Circuit With Duplex Optoelectronic Display" discloses a transformerless power supply and display energizing circuit for a clock circuit with a duplex optoelectronic display driven by low voltage integrated clock circuit. The clock circuit has positive and negative voltage input terminals and the duplex display has a first terminal connected to a first common cathode and a second terminal connected to a second common cathode of the display. The transformerless circuit is powered from an AC source. An impedance, which may be either resistive or reactive, reduces the AC voltage to a level suitable for the integrated clock circuit. The transformerless circuit also generates synchronous DC level-shifted pulse trains for driving the positive input terminal of the integrated clock circuit alternately between a first voltage and a reference voltage while synchronously driving the display first terminal between the first voltage and a voltage of equal amplitude and opposite polarity.

U.S. Pat. No. 4,595,861, issued to Simopoulos et al. and entitled "Power Supplies for Electroluminescent Panels" discloses circuitry for converting a DC power supply to an AC power supply for electroluminescent lamps which are selfinhibited from further oscillations and are current limited in the event that a failure occurs in an EL (electroluminescent) lamp which results in the EL lamp being shorted. According to one embodiment of this patent, a single ended and push/pull transformer power supply is disclosed and according to a second embodiment, a transformerless solid state power supply is disclosed. The solid state power supply uses a voltage multiplier to increase the AC or square wave voltage to a level of almost 140 volts for powering the EL lamp. Thus, it is seen that the circuitry in this patent discloses techniques for converting from DC power to AC power, not AC power to DC power and further provides circuitry to inhibit oscillations and operations of the circuitry in the event of a shorting of the EL lamp or a substantial voltage drop.

U.S. Pat. No. 4,201,039, to Roland M. Marion and entitled "Numerical Display Using Plural Light Sources and Having a Reduced and Substantially Constant Current Requirement" discloses a numerical digital display having a reduced DC current requirement per character display site. The circuitry is useful for powering a digital display in an AC powered clock or clock radio in which it is desirable to keep the DC current requirement of the display to a substantially constant minimum suitable for use with a low cost transformerless power supply conventional with radio receivers. The current requirements of the digital character display site is reduced over that of full parallel operation by selectively serializing certain light sources in a manner leaving the display control circuitry uncomplicated by permitting each light source state to be controlled by a shunt control switch sharing a common bus. The shunt control, which diverts rather than prevents current flow in the display, allows the display current to remain substantially constant irrespective of the digital numbers displayed.

U.S. Pat. No. 4,109,180 to Ogle et al., and entitled "AC-Powered Display System With Voltage Limitation" discloses an AC-powered display system which includes a gas discharge display panel, an integrated circuit, and a limiting network. The integrated circuit is provided as a display pattern controller and may also comprise a digital alarm clock circuitry which provides outputs for controlling the gas discharge display panel. The circuitry also includes a limiting network which reduces the current through the system in response to an excessive voltage across the controller. U.S. Pat. No. 4,063,234 to Arn et al. and entitled "Incandescent, Flat Screen, Video Display" discloses a flat screen video display comprising a plurality of incandescent lamps arranged in an addressable X-Y matrix. The circuitry also provides a memory and driver circuit for each individual incandescent lamp for use in a flat screen video display apparatus.

U.S. Pat. No. 3,602,795 to John B. Gunn and entitled "Transformerless Power Supply" discloses circuits for converting an input voltage from a high amplitude to a lower amplitude DC voltage.

SUMMARY OF THE INVENTION

Therefore, it is an object of the invention to provide a transformerless power supply for use with an LED digital clock circuitry and display with or without a radio in combination.

It is another object of this invention to provide a transformerless power supply circuitry which is inexpensive to manufacture and which is power efficient.

It is yet another object of the present invention to provide a low power transformerless power supply circuitry which can meet occasional short-term, high-amperage demands.

It is still another object of the invention to provide an LED digital clock display having a substantially reduced duty cycle.

These and other objects are achieved by the apparatus and methods of this invention for a transformerless LED digital alarm clock with or without radio which uses AC line voltage as a source of power. The power supply portion of the clock circuitry comprises a pair of line terminals for receiving a source of the single phase AC power having a line voltage level of between about 100 and about 225 volts (for clocks used in Europe and other parts of the world). The AC power is rectified by standard rectifier circuitry such as by a full wave bridge rectifier. A voltage divider circuitry is connected between one of the line terminal and one of the inputs of the rectifier for substantially reducing the AC voltage seen by the rectifier to some value of less than about 15 volts. The rectifier includes a positive output and a negative output and has a capacitor connected across said outputs to filter or smooth the rectified power. In addition, a diode circuitry is connected across the positive and negative outputs of the rectifier to clamp the rectified and filtered power output at a DC voltage of between about 3.6 VDC and about 5 VDC for use as the low voltage DC power supply. According to one embodiment of the invention, the diode circuitry comprises a zener diode wherein the cathode end of the zener diode is connected to the positive output of the rectifier and the anode end of the zener diode is connected to the negative output of the rectifier. A positive DC output terminal is connected to the positive output of the rectifier and a negative DC output terminal is connected to the negative output of the rectifier. A source of clocking pulse is provided by any suitable source such as a crystal oscillator circuit or by synchronizing with the AC line voltage.

The positive and negative terminals of a microprocessor suitable for providing four cathode outputs at four separate non-overlapping predetermined periods of time are connected to the positive and negative DC output terminals of the rectifier circuitry respectively. In a preferred embodiment, the microprocessor also provides at least seven anode outputs. The four cathode outputs and the seven anode outputs are used to individually control four separate LED digital displays at reduced duty cycles. At least two of the displays are capable of displaying all of the ten possible digits (0–9). In addition, in a preferred embodiment, the circuitry further includes a NiCad (Nickel Cadmium) rechargeable battery connected to the positive and negative DC output terminals for receiving a charging current. A blocking diode is included which has its anode connected to the positive output of the rectifier and its cathode connected to the positive DC output terminal of the battery such that a loss of AC line voltage will not result in the discharge of the battery.

As was discussed heretofore, the present circuitry can also be used to operate a clock radio. To provide a wake-up call such as by an alarm or a radio, the alarm or radio is connected between the positive and negative outputs of the rectifier circuit through a switch. The switch may be an electronic switch such as a bipolar diode which is turned on by an output from the microprocessor at the selected time.

BRIEF DESCRIPTION OF THE DRAWINGS

These and other features of the present invention will be more fully disclosed when taken in conjunction with the following Detailed Description of the Invention in which like numerals represent like elements and in which.

DETAILED DESCRIPTION OF THE INVENTION

Figure 1:
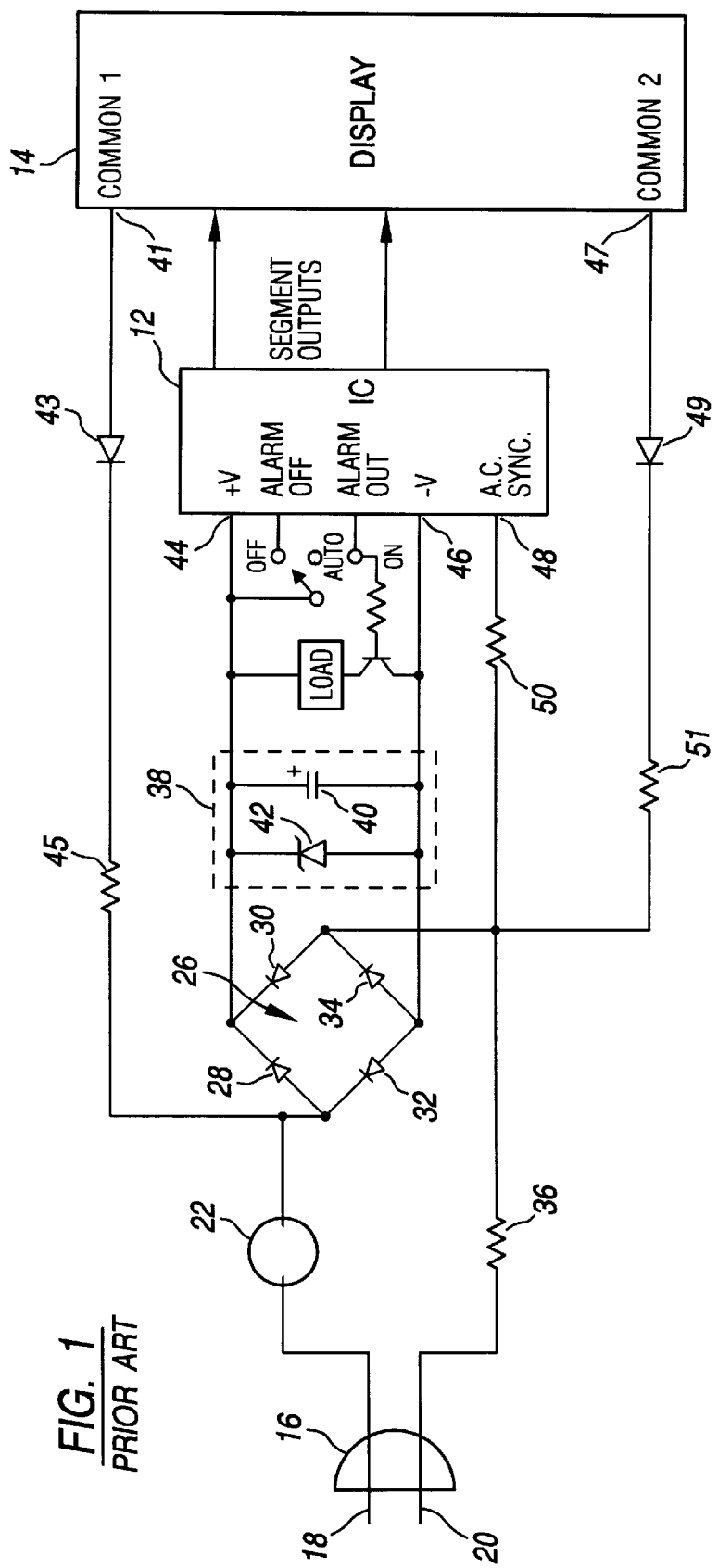
FIG. 1 is a circuit diagram of a prior art transformerless LED digital clock using a commercially available Integrated Circuit (IC), i.e., clock circuit and including an LED duplex clock display.

Referring now to the prior art FIG. 1, there is shown a typical digital clock with an LED digital display. As seen in FIG. 1, the clock circuitry utilizes a conventional clock IC 12 and LED display panel 14.

This prior art transformerless duplex clock circuit is connected to a source of 115 VAC power via plug 16. Plug 16 is a conventional AC plug having two prongs 18 and 20. With prong 20 connected to the reference or grounded side of the AC, while prong 18 is connected to the "hot" side. Thus, prong 20 will remain at a constant reference voltage while the AC voltage at prong 18 will alternately change polarity.

The 115 VAC power is reduced to a usable level by an impedance element 22. Impedance element 22 is typically a capacitor 24 with a known impedance at the AC input frequency. The value of capacitance is chosen to give a desired reduction in the 115 VAC input power. Impedance element 22 would be a resistive impedance, however, an advantage of using a capacitive impedance such as capacitor 24 to reduce the input voltage is that, unlike a voltage-dropping resistor, the capacitor does not dissipate power. Therefore, there is little to no power loss or heat generated from the reactive impedance element.

The reduced AC voltage from capacitor 24 forms one input to a full-wave bridge rectifier 26 which consists of diodes 28, 30, 32 and 34 connected in the well-known bridge rectifier configuration. The other input of bridge rectifier 26 is returned to the reference terminal 20 of plug 16 via a current limiting resistor 36.

The full-wave rectified AC voltage at the output terminals of bridge rectifier 26 form the input to voltage regulator circuit 38, which consists of capacitor 40 and voltage regulating zener diode 42. Voltage regulating circuit 38 smooths and regulates the full-wave rectified output of bridge rectifier 26 in a well-known manner. The regulated output voltage from regulating circuit 38 is applied to the positive terminal 44 and the negative terminal 46 of clock IC 12. Assuming diode 42 is a 12-volt diode, the difference in voltage between the +V (44) and −V (46) inputs to clock IC 12 will be 12 VDC.

Clock IC 12 is connected to LED display panel 14 in a known manner. However, the AC synchronizing input 48 to clock IC 12 is connected to the reference terminal 20 of the AC input via resistors 36 and 50. Thus, the AC synchronizing input to the clock IC 12 does not fluctuate but is held at the reference voltage.

Also as shown, a first terminal "common 1" having reference number 41 is connected through diode 43 and resistor 45 to the positive input of rectifier bridge 36. Likewise, a second terminal "common 2" having a reference number 47 is connected through diode 49 and resistor 51 to the negative or reference input to rectifier bridge 36. Terminals 41 and 47 are connected one each to the two sets of cathodes of the duplex four digit display 14.

Figure 2:
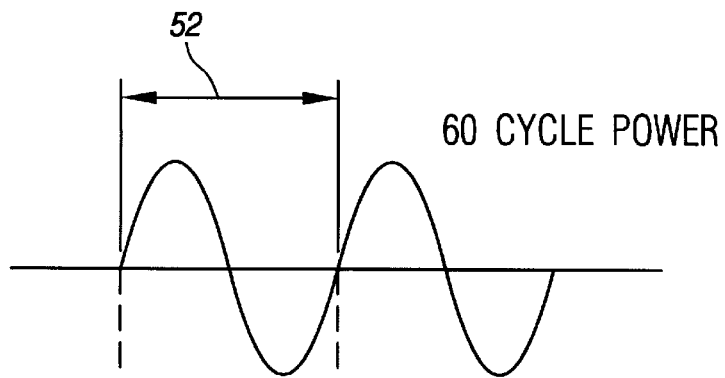
FIG. 2 illustrates a 60 cycle commercial power sine wave.

Referring now to FIG. 2, there is shown a typical sine wave representing 60 cycle 120 VAC power commercially available in the United States. As can be seen, the period of the 60 cycle time wave is 16.67 milliseconds as shown by the double-headed arrow 52. Thus, each half cycle is approximately 8.33 milliseconds or one half of the total cycle time of a single sine wave.

Figure 3:
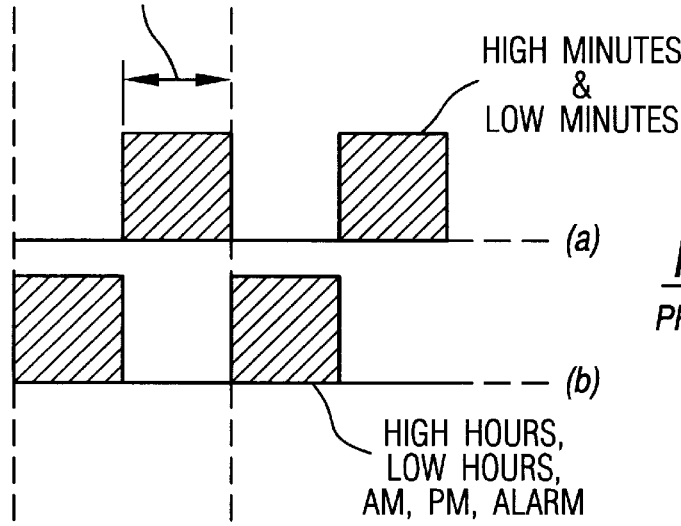
FIG. 3 shows the duty cycle for power applied to the digital clock display of the prior art circuit of FIG. 1 as it relates to the 60 cycle power of FIG. 2.

Now referring to FIG. 3, there are shown representations of the time periods power is supplied to each of the four (4) LED displays discussed with respect to the prior art circuitry of FIG. 1. As shown, the graphs of FIGS. 3A and 3B are correlated with the sine wave of FIG. 2, and as can be seen, each of the "on" periods represented by the shaded areas are substantially equivalent to one half of a sine wave or approximately 8.3 milliseconds as indicated by double-headed arrow 54 of FIG. 3A. As examples only, the graph of FIG. 3A represents both the "low minutes" (i.e., minutes 0 through 9), and the "high minutes" (0 through 59). In a similar manner, the graph of FIG. 3B may be chosen to represent the "low hours" (0 through 9) and the "high hour" "1" (also perhaps 2 if a 24 hours clock is used), an alarm indicator and an AM or PM indicator. Thus, it is seen that during a full cycle of sine wave power, substantially half of the LED's will always be "on." This is in contrast to the very low duty cycle for the "on" time of the LED's of the present invention which is shown as also being coordinated with the 60 cycle sine wave of FIG. 2 and which will be discussed in detail hereinafter.

Figure 4:
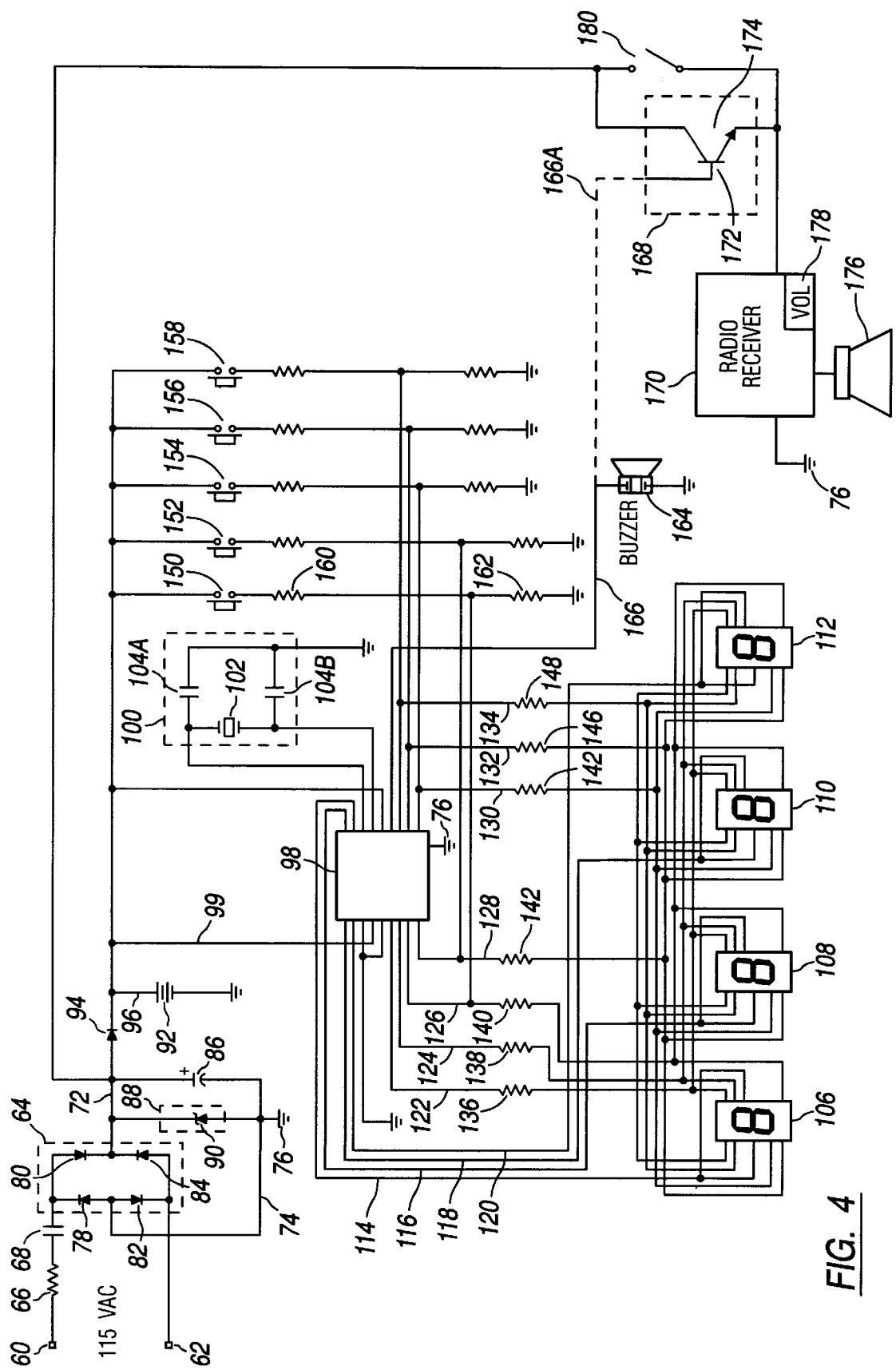
FIG. 4 is an embodiment of circuit diagram of the LED digital clock and display incorporating the present invention.

Referring now to FIG. 4, there is shown a first embodiment of transformerless circuitry for powering an LED digital alarm clock according to the teachings of the present invention. As shown, there are a pair of terminals 60 and 62 for receiving normal line AC voltage such as 115 VAC. It will be appreciated that although 115 volts may be considered the nominal voltage for most power sources in the United States, it is not unusual that line voltage varies 5 to 10 volts to provide more or less voltage. Further, other countries such as the continent of Europe, typically use a 220 volt supply as standard power. The concept of the circuitry shown in FIG. 4 would be suitable for use with either nominal 115 VAC or nominal 220 VAC and slight variations of both. However, in the described embodiment, some of the elements making up the circuit are specifically designed for the U.S. 115 VAC nominal voltage average.

Figure 5:
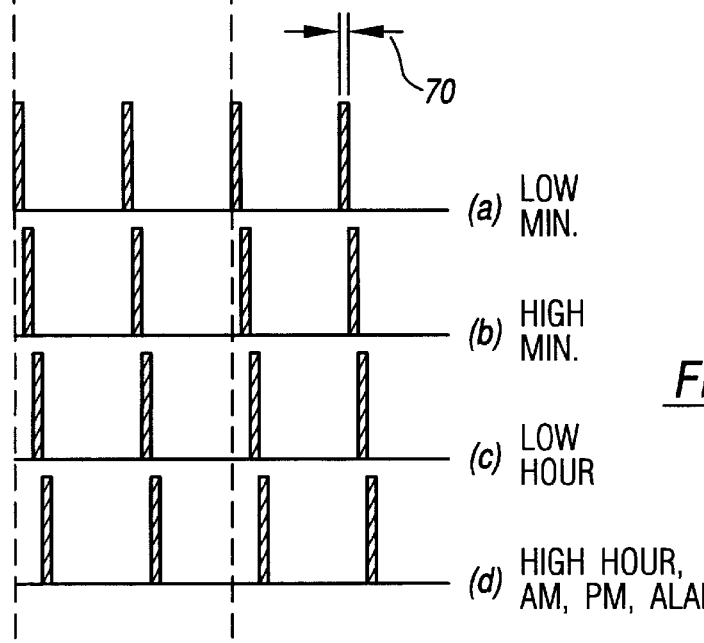
FIG. 5 comprises the duty cycle for power applied to the digital clock display of the embodiment of FIG. 4.

As shown, the two input terminals 60 and 62 are connected as inputs to a rectifier circuitry 64. A resistor 66 and a capacitor 68 are connected as a voltage divider series circuit that prevents the resistor 66 from dropping essentially the entire AC voltage, and in fact most of the voltage is dropped across the capacitor 68. Capacitor 68 should have a voltage rating of at least 1.5 times the line voltage. However, as will be discussed in more detail later and as is indicated in FIG. 5, each of the four separate digits of the present invention are on for only 0.4 milliseconds as indicated by double-headed arrow 70 or a total of 0.16 milliseconds per half cycle of the AC voltage sine wave for all four digits. Thus, the total on time represents a duty cycle of about 4% compared to 100% duty cycle for the prior art circuit of FIG. 1. This of course, represents a tremendous power savings. In addition, because of its greatly reduced power requirements, the current rating of the voltage-dropping capacitor 68 can be significantly reduced. This, of course, also allows for a significant reduction in physical size. Typically, and for most circuits, the resistor 66 and the capacitor 68 will drop the input to the rectifier circuit 64 from the 115 VAC to around 100 volts or less, and for the embodiment of FIG. 1, these elements are chosen to be about 100 ohms and 0.47 $\mu$F respectively. Rectifier circuit 64 also includes a positive output on line 72 and a negative output on line 74 which, in the embodiment shown, is connected to ground 76. Any suitable rectifier circuit may be used in this invention however a full bridge rectifier such as made up by the diodes 78, 80, 82 and 84 are effective and readily available. A filter capacitor 86 is connected across the output lines 72 and 74 of the rectifier. Filter capacitor 86 is chosen to have a capacitance of about 1000 $\mu$F for the embodiment of FIG. 1.

Also included is a diode circuit 88 which is connected across the positive/negative outputs 72 and 74 respectively of the rectifier so as to provide a clamped voltage output, which clamped voltage output as was discussed above is smoothed by filter capacitor 86. In one embodiment, the voltage output of the rectifier circuitry 64 is clamped at a voltage of about 5.1 VDC so as to be useful as a low voltage DC power source for powering low current DC devices. As shown, a zener diode 90 may be chosen to clamp the voltage at the desired level such as is shown in the dashed line box 88. Alternately, a series of voltage-dropping dividers connected anode to cathode may be used with the first diode of the series having its anode connected to line 72 and the last diode of the series with its cathode connected to line 74. A rechargeable battery such as a NiCad (Nickel Cadmium) battery 92 is also connected across the clamped filtered voltage provided by the diode circuitry 64 and capacitor 86. Preferably, there is also included a blocking diode 94 with its anode connected to the positive output of the rectified voltage and its cathode connected to a positive terminal 96 of the NiCad battery. Blocking diode 94 prevents the battery from bleeding current back into the power supply and rectifier circuit 64 in the event of a line AC voltage power failure. The blocking diode 94 also further drops the supply voltage down to approximately 3.8 volts. Thus, if the NiCad battery 92 is chosen to be a common 3.6 volt battery, it will be appreciated that at a charging voltage of 3.8 volts there will be a charging current into the battery. The positive terminal of the microprocessor 98 is connected through line 99 to the positive terminal 96 of battery 92 and the negative terminal is connected to ground 76. There is also shown an oscillator circuitry 100 for providing clocking pulses to microprocessor 98 as shown. Oscillator circuitry 100 includes a 0.4 mHz, crystal 102 and a pair of capacitors 104a and 104b connected across crystal 102 to maintain oscillation of the circuitry. In the embodiment shown, capacitors 104a and 104b are each about 33 pico farads.

As was discussed above, although other types of rechargeable batteries may be used in the circuitry, a rechargeable vented Nickel Cadmium battery is particularly useful. The Nickel Cadmium batteries can allow for a continuous and safe overcharging without getting overheated. This is unlike other types of unvented batteries such as Nickel Metal Hydride or Lithium batteries which tend to overheat when they are overcharged. If batteries other than the Nickel Cadmium type are chosen, a thermistor circuit or other form of charge control circuitry well known in the art should be added to disconnect the battery from the charging circuit when the battery is fully charged to avoid overheating or damage to the batteries and/or the clock circuitry.

As shown, unlike the prior art's digital clock which used a commercially available integrated circuit specifically designed for digital clocks, the present invention uses a commercially available microprocessor 98 programmed and connected to provide four cathode outputs for each of the four individual LED digital displays 106, 108, 110 and 112. The microprocessor 98 also will provide a minimum of seven anode outputs to the LED display such that each of the seven segments in a common seven segment digital display can be individually controlled. Although generating seven anode outputs was normal with the prior art dedicated clock IC's, these dedicated IC's provide only two cathode outputs such that one half of the display or two of the digits are illuminated at a time as was discussed above with respect to FIGS. 3A and 3B. This cannot be changed in the prior art dedicated clock IC's and consequently, the 100% duty cycle of power as shown in the FIGS. 3A and 3B is required. However, the "quad" or "four common" display of the present invention is made possible by the four separate cathode outputs of the microprocessor 98 and allows each one of the individual digital displays to be individually energized for any selected amount of time. Thus, the complete power management and overall power reduction of the present invention is achieved. Thus, as shown, the four individually controlled cathode outputs 114, 116, 118 and 120 are provided to the individual digital digit displays 106, 108, 110 and 112 respectively. Also as mentioned above, microprocessor 98 further includes outputs on lines 122, 124, 126, 128, 130, 132 and 134, each of which is routed to each of the four digital displays 106, 108, 110 and 112. Thus, in the embodiment shown, each digital display is capable of controlling each of the seven segments of a seven segment digital indicator. Dropping resistors 136 through 148 are located in each of the anode lines 122 through 134 to prevent excessive current draw in case of a display failure. In the embodiment shown in FIG. 4, resistors 136 through 148 are each chosen to be at about 10 ohms.

Also as shown, there are five separate switches 150 through 158 for setting the time of the clock, for setting the alarm time on the clock, for causing an increase of the alarm or time set, and a button for causing the decrease of the alarm or time set as indicated by buttons 150, 152, 154 and 156 respectively. Button 158 represents the control for turning the alarm ON or OFF. Each of the switches receive power from the cathode of diode 94 and/or battery 92 and are connected to a voltage divider comprised of a pair of resistors such as resistors 160 and 162 shown with respect to switch 150. The two resistors are chosen in the present embodiment to have values of 820 ohms and 2.2 kohms respectively. Each of the other four switches 152, 154, 156 and 158 have similar voltage dividing circuitries made up of similar resistors. Each of the nodes between the two resistors 160 and 162 are provided as control inputs to microprocessor 98 and to each of the individual digital indicators 106 through 112.

In addition to the control circuitry provided by the switches 150 through 158, microprocessor 98 further provides an output to loudspeaker 164 by means of line 166. According to one embodiment, microprocessor 98 will generate an electrical signal in the audible range and preferably at about 400 Hz which will act as a buzzer or alarm. Thus, it will be appreciated that the output on line 166 to the speaker 164 will occur in response to the alarm set time being reached on the clock. To turn the buzzer or alarm OFF, the user will hit the ALARM ON/OFF button 158 discussed heretofore.

The circuitry discussed provides for an alarm clock with a buzzer or other generated noise used as an alarm. However, it will be appreciated that most people prefer to be awakened by music such as by a clock radio. To this end, there is further included a switch member 168 connected to sound circuitry 170. Also, as shown, the negative side of sound circuitry 170 is connected to ground 76. The switch 168 is typically an electronic switch such as a "PNP" transistor which is turned on by a trigger signal to the base 172 of the transistor 174 at the set alarm time. According to the embodiment shown in FIG. 4, the trigger signal to base 172 of ON and OFF power transistor 174 is from microprocessor 98 on line 166 and the extension of line 166 shown by the dashed line portion 166*a*. It will be appreciated of course if the output from microprocessor 98 on line 166 is a trigger signal, it will simply be a continuous signal with a predetermined duration rather than the 400 Hz alarm signal as discussed above. Sound circuitry 170 is shown having a speaker 176 for converting the electrical signals representative of sound to audible signals which will be heard by the user. Sound circuitry 170 could also be a buzzer, but preferably, as discussed above, is a radio receiver, a CD player or other type of music making device, or even an IC chip which makes different and pleasant sounds. Although all of the sound circuits may not require a volume control, there is also shown a volume control 178 which is typically required for the radio receiver, but may also be used for the sound provided by an integrated circuit or even the strident sound of a buzzer. As shown, the power output to the sound circuitry 170 will be the 3.6 volts across the zener diode 36.

There is also shown a manual ON/OFF switch 180 in parallel with electrical switch 168 to allow the radio to be turned ON at times other than by the alarm.

The corresponding structures, materials, acts, and equivalents of all means or step plus function elements in the claims below are intended to include any structure, material, or act for performing the function in combination with other claimed elements as specifically claimed.

What is claimed is:

1. A transformerless LED digital clock circuitry using AC line voltage as a source of power comprising:

a pair of line terminals for receiving a source of single phase AC power having a line voltage level of between about 100 and 225 volts;

a rectifier having a pair of inputs connected through said pair of line terminals to said source of single phase AC power and further including positive and negative outputs for providing a rectified power output;

a voltage divider series circuit connected between one of said line terminals and one of said pair of inputs of said rectifier, said series circuit including a series connected resistor and a capacitor, said resistor and capacitor selected to substantially drop the voltage of said received AC power;

a capacitor connected across said positive and negative outputs of said rectifier to filter said rectified power output;

a diode circuit connected across said positive and negative outputs of said rectifier to clamp said rectified and filtered power output at a DC voltage of between about 3.6 VDC and 5.0 VDC for use as a low voltage DC power source;

a positive DC output terminal connected to said positive output of said rectifier and a negative DC output terminal connected to said negative output of said rectifier;

a source of clocking pulses;

an LED display comprised of at least four individually controlled single digit displays, each of said single digit displays including a multiplicity of LED's for forming at least one selected number between 0 and 9, each of said LED's including a cathode and a anode; and a microprocessor connected to said source of clock pulses and across said low voltage DC power, said microprocessor providing at least four cathode outputs at four separate non-overlapping predetermined periods of time, one each of said cathode outputs connected to the LED cathodes of one of said four single digit displays, and said microprocessor further providing a multiplicity of anode outputs, specific ones of said multiplicity connected to specific LED anodes of each of said four single digit displays.

2. The LED digital clock of claim 1 wherein said four separate non-overlapping predetermined periods of time are less than ½ cycle of the AC line power.

3. The LED digital clock of claim 2 wherein said AC line power is 60 cycle power and said predetermined periods of time are about 0.4 milliseconds.

4. The LED digital clock of claim 1 wherein said source of clocking pulses is an oscillating circuit with a 32.768 kHz quartz crystal.

5. The LED digital clock of claim 1 and further including switches for providing control signals to said microprocessor to control clock functions for setting the time and the alarm.

6. The LED digital clock of claim 5 and further including switches connected to said microprocessor for setting time forward and an alarm forward, and setting time back and an alarm back.

7. The LED digital clock of claim 1 wherein said diode circuit comprises a plurality of diodes connected in series anode to cathode, and wherein the anode end of said series is connected to said positive output of said rectifier and said cathode end of said series is connected to said negative output of said cathode.

8. The LED digital clock of claim 1 wherein said diode circuit comprises a zener diode having its cathode connected to said positive output of said rectifier and its anode connected to said negative output of said rectifier.

9. The LED digital clock of claim 1 and further comprising a battery connected to said positive and negative DC output terminals for receiving a charging current, and a blocking diode having its anode connected to said positive output of said rectifier and its cathode connected to said positive DC output terminal, such that a loss of AC line voltage will not result in the discharge of said battery.

10. The LED digital clock of claim 9 wherein said blocking diode drops voltage from said positive output of said rectifier to said battery by about 1.5 volts and said diode circuit provides a voltage clamped at 5.1 volts for charging a 3.6 volt NiCad rechargeable battery.

11. The LED digital clock of claim 1 wherein said microprocessor further provides a signal output at a preselected time.

12. The LED digital clock of claim 11 wherein said signal output is an electrical alarm signal having a frequency in an audible frequency range and further including a speaker for converting said electrical alarm signal to an audible alarm signal.

13. The LED digital clock of claim 11 wherein said signal output from said microprocessor at said preselected time is a control signal and further including a sound source and a switch, said switch for connecting power to said sound source in response to said signal output.

14. The LED digital clock of claim 13 wherein said sound source is a radio.

15. The LED digital clock of claim 13 wherein said sound source is a prerecorded sound.

* * * * *